United States Patent [19]

Chiu et al.

[11] Patent Number: 4,871,572

[45] Date of Patent: Oct. 3, 1989

[54] REPLACEMENT OF MUNG BEAN STARCH BY MODIFIED POTATO AND SWEET POTATO STARCH IN ORIENTAL NOODLES

[75] Inventors: Chung-Wai Chiu, Westfield, N.J.; Hunter Chua, Bukit Batok, Singapore

[73] Assignee: National Starch and Chemical Corporation, Bridgewater, N.J.

[21] Appl. No.: 133,777

[22] Filed: Dec. 16, 1987

[51] Int. Cl.$^4$ ............................................. A23L 1/16
[52] U.S. Cl. ................................... 426/557; 426/661
[58] Field of Search ............................... 426/557, 661

[56] References Cited

U.S. PATENT DOCUMENTS

| | | | |
|---|---|---|---|
| 2,328,537 | 9/1943 | Felton et al. | 426/658 |
| 2,801,242 | 7/1957 | Kerr et al. | 426/654 |
| 4,590,084 | 5/1986 | Miller et al. | 426/557 |
| 4,675,199 | 6/1987 | Hsu | 426/557 |

FOREIGN PATENT DOCUMENTS 0074960  4/1984  Japan .................................... 426/557

OTHER PUBLICATIONS

Cheng et al. Characterization of Red Bean (Phaseolus Radiatus Var. Aurea) Starch and Its Noodle Quality, Journal of Food Science, vol 46 (1981), pp. 78–81.

J. Food Science 46, p. 79 (1981).

Proc. 6th International Congress of Food Science and Technology, pp. 111–112 (1983.

*Primary Examiner*—Donald E. Czaja
*Assistant Examiner*—Helen Pratt
*Attorney, Agent, or Firm*—Margaret B. Kelley; Edwin M. Szala

[57] ABSTRACT

The present invention provides an imitation oriental noodle consisting essentially of starch and water, wherein the mung bean starch present in the noodles is replaced with at least about 30% by weight of a crosslinked potato starch having a sediment volume of 2–16 ml or a crosslinked sweet potato starch having a sediment volume of 2–4 ml, the noodle containing the crosslinked potato or sweet potato starch replacement being comparable to the noodle containing 100% mung bean starch. For 100% replacement crosslinked potato starches having a sediment volume of 3–11 ml are preferred.

12 Claims, No Drawings

REPLACEMENT OF MUNG BEAN STARCH BY MODIFIED POTATO AND SWEET POTATO STARCH IN ORIENTAL NOODLES

BACKGROUND OF THE INVENTION

Mung bean noodles are a specialty oriental food. The noodles are translucent both before and after cooking, are resilient after cooking, and have a bland taste. Mung bean starch provides unique properties and is the ideal material for noodle manufacture. It is, however, expensive and attempts have been made to replace it with other starches.

One such attempt is reported in an article by C.-Y. Lii and S.-M. Chang entitled "Characterization of Red Bean (Phaseolus radiatus var. Aurea) Starch and Its Noodle Quality", J. Food Science 46, p. 79 (1981). It involved the use of red bean starch and an equal mixture of red bean starch and mung bean starch. Organoleptic evaluation indicated that the noodles made from the mung bean-red bean starch mixture were similar in texture to the mung bean noodles, but the red bean starch noodles were slightly softer. The tensile strength of the noodles decreased in the order mung bean, mixed bean, and red bean. The mung bean noodles had a tensile strength of 13.0 g after 10 minutes cooking time (standard cooking time) compared to only 4.0 g for the mixed bean noodles and 1.6 g for the red bean noodles.

Other attempts to replace mung bean starch have included the use of canna, sweet potato, and cassava starches which have amylose contents of about 27, 26.5, and 22.5% respectively; mung bean starch has an amylose content of about 33%. Noodles prepared from these tuber starches were inferior. They were too soft and their solid losses during cooking were much higher. See the article by S.-M. Chang entitled "The Fine Structure of The Amyloses From Some Tuber Starches and Their Noodle Quality", Proc. 6th International Congress of Food Science & Technology, pp. 111-112 (1983).

SUMMARY OF THE INVENTION

The present invention provides an oriental noodle consisting essentially of starch and water, wherein the mung bean starch used in the preparation of the noodles is partially replaced with a granular crosslinked potato starch having a sediment volume of 2-16 ml or a granular crosslinked sweet potato starch having a sediment volume of 2-4 ml, the noodle containing the crosslinked potato or sweet potato starch replacement being comparable to the noodle containing 100% mung bean starch. For 30% replacement the above sediment volumes are satisfactory. For 100% replacement crosslinked potato starches having a sediment volume of 3-11 ml are preferred. For 100% replacement crosslinked sweet potato starches having a sediment volume of 2-4 ml are satisfactory.

One method of preparing the oriental noodles involves the steps of:

(a) preparing a dough by mixing 95 parts of a granular crosslinked potato starch or a granular crosslinked sweet potato starch into a cold, cooked starch dispersion prepared by heating 5 parts of the crosslinked starch in 95 ml of water;

(b) thoroughly mixing the dough;

(c) extruding the mixed dough directly into boiling water;

(d) transferring the extruded noodles to ice cold water;

(e) maintaining the cooled noodles in the ice cold water for a few minutes;

(f) freezing the cold noodles;

(g) thawing the frozen noodles; and (h) air-drying the thawed noodles.

The dough may be extruded in various shapes which will depend upon the shape of the die used in the extruder.

DESCRIPTION OF THE PREFERRED EMBODIMENTS

Suitable granular crosslinked potato and sweet potato starches may be prepared according to standard procedures (see U.S. Pat. No. 2,328,537 issued Sept. 7, 1943 to G. E. Felton et al. and U.S. Pat. No. 2,801,242 issued July 30, 1957 to R. W. Kerr et al.). The reaction conditions employed will of course vary with the type and purity of the crosslinking agent used, as well as the starch base (i.e., potato or sweet potato), the reaction scale, temperature, time, and the like. The amount of crosslinking agent used should be sufficient to give a starch with the required sediment volume. With potato starch the amount of phosphorus oxychloride typically used to obtain a sediment volume of 3-15 ml is about 0.015-0.00025% and to obtain a sediment volume of 5-12 ml it is about 0.01-0.005%. With potato starch the amount of sodium trimethaphosphate required is about 0.075-0.0125% and 0.05-0.025%. With sweet potato starch the amount of phosphorus oxychloride typically used to obtain a sediment volume of 2-4 ml is about 0.025-0.01%. With sweet potato starch the amount of sodium trimethaphosphate is about 0.125 to 0.05%. It is within the skill of the starch practitioner to determine the amount of crosslinking agent required to provide the desired sediment volume, with higher amounts of the crosslinking agent being required to provide a lower sediment volume.

The reaction between the starch and crosslinking agent may be carried out in an aqueous medium, which is preferred, in which case the starch is slurried in water and adjusted to the proper pH and the crosslinking agent added thereto. For example, with phosphorus oxychloride the reaction is typically carried out at 5-60° C., preferably 20-40° C. for 0.2 to 2.4 hours. With epichlorohydrin or sodium trimethaphosphate longer reaction times are required. After the reaction is complete the pH of the mixture is generally adjusted to 5.5 to 6.5 using a common acid or base as necessary. The granular product may be recovered by filtration and washed with water and air-dried.

Crosslinking agents suitable for food starches include epichlorohydrin, phosphorus oxychloride, sodium trimethaphosphate, and adipic-acetic anhydride (1:4). In the United States the currently permitted treatment levels include up to 0.3% epichlorohydrin and up to 0.1% phosphorus oxychloride. Treatment with sufficient sodium trimethaphosphate to provide up to 0.04% bound (residual) phosphate, calculated as phosphorus, is permitted. Treatment with adipic-acetic anhydride may include up to 0.12% adipic anhydride and up to 2.5% bound acetate. Of the crosslinking agents discussed above, phosphorus oxychloride is preferred.

The above crosslinking procedures are conventional and well known to those skilled in the art and described in such publications as "Handbook of Water Soluble Gums and Resins", Robert L. Davidson (Editor), Chapter 22: Starch and Its Modifications by M. W. Rutenberg, McGraw Hill Book Company (New York 1980).

It should be noted that granular stabilized starches, i.e., derivatized starches such as ethers and esters, are not suitable for use herein even when crosslinked. There is no problem in forming the dough with these starch derivatives; however, when extruded into the boiling water, poor quality noodles are formed. Likewise, cold-water-dispersible (i.e., pregelatinized starches) crosslinked starches are not useful. The dough is too heavy and one cannot get a high enough solids content.

The preparation of the noodles is conventional and well known to those skilled in the art. A method for the preparation of the noodles is described in the Lii and Chang article discussed in the Background of The Invention.

The following testing procedures are used:

Noodle Evaluation

The noodles are cooked in boiling water for five minutes, removed, drained, rinsed in cold water, and placed on a plate for an evaluation of their color, cooked appearance, and texture. The cooked noodles are rated as soft, sticky, gummy, strong, chewy, elastic, and similar to mung bean noodles.

Sediment Volume Test

A 1% dispersion of the crosslinked starch is cooked, 10 ml of the dispersion is diluted to 100 ml, and the sediment volume is measured after standing for 24 hours at room temperature. The sediment volume is a measure of the degree of crosslinking, but as can be seen from the test results the same sediment volume does not provide comparable noodles with the different starch bases.

In the Examples which follow, all parts and percentages are given by weight and all temperatures are in degree Celsius unless otherwise noted.

EXAMPLE I

This example describes the replacement of 100% of the mung bean starch with various granular crosslinked potato starches.

The noodle dough was prepared by mixing 95 g of the crosslinked potato starch (dry basis) into a 5% cold, cooked starch dispersion prepared by heating 5 g of the crosslinked potato starch in 95 ml of water until it reached 85° C. The dough was mixed well; it contained approximately 54% moisture. It was placed in a 20 ml syringe and extruded directly into boiling water (90–95° C.). After 20 sec. the noodles were immediately transferred to ice cold water, kept there for 3 min., and then frozen at −10° C. for 24 hr.

TABLE I

| | | 100% Replacement with Crosslinked Potato Starch | | | |
|---|---|---|---|---|---|
| | | | APPEARANCE AND TEXTURE OF EXTRUDED NOODLES | | |
| STARCH SAMPLE | SEDIMENT VOLUME (ml) | CONSISTENCY OF DOUGH | UNCOOKED | COOKED | CHEWABILITY |
| Mung Bean (comparative) | 0 ml | smooth, glossy, medium | transparent | strong, elastic | resilient, bland taste |
| Crosslinked Potato (comparative) | 15 ml | not smooth, heavy | *too heavy to extrude | — | — |
| Crosslinked Potato | 12 ml | smooth, glossy, medium | transparent | soft | — |
| Crosslinked Potato | 10 ml | smooth, glossy, medium | transparent | similar to M.B. | similar to M.B. |
| Crosslinked Potato | 7 ml | smooth, glossy, medium | transparent | similar to M.B. | similar to M.B. |
| Crosslinked Potato | 5 ml | smooth, glossy, heavy | transparent | similar to M.B. | similar to M.B. |
| Crosslinked Potato | 3 ml | smooth, glossy, heavy | transparent | similar to M.B. | slightly harder than M.B. |
| Unmodified Potato (control) | 0 ml | not smooth, heavy | transparent | gummy, soft | soft |

*No noodles were prepared.
Crosslinked with phosphorus oxychloride.
M.B. indicates Mung Bean.

After thawing in cool water for 2 hr., the noodles were air-dried in an oven at 40° C. and evaluated.

The results in Table I show that the unmodified potato starch was unsatisfactory. While the noodles were transparent, their cooked qualities were unacceptable. They were gummy and soft, whereas they should have been strong, elastic, and resilient like the mung bean control. The results also show that crosslinked potato starches having a sediment volume of 3 ml to 11 ml were satisfactory. The uncooked noodles were transparent and comparable to the mung bean noodles. The cooked appearance was also similar to that of the mung bean noodles. The chewability, except for the crosslinked potato starch having a sediment volume of 3 ml, was similar to that of mung bean noodles. All of the noodles had a bland taste. The least highly crosslinked starch, i.e., the starch having a sediment volume of 15 ml, was too heavy to extrude.

EXAMPLE II

This example shows the use of various crosslinked potato starches at 30% replacement. The noodles were prepared as above except that a dry blend (prepared in a coffee grinder) of the crosslinked potato starch and mung bean starch was prepared prior to the cooking.

The results in Table II show that all of the crosslinked potato starches gave cooked noodles comparable to the cooked mung bean noodles. The less crosslinked starch formed a heavier dough.

TABLE II

30% Replacement with Crosslinked Potato Starch

| STARCH* | SEDIMENT VOLUME (ml) | CONSISTENCY OF DOUGH | APPEARANCE AND TEXTURE OF EXTRUDED NOODLES | | CHEWABILITY |
|---|---|---|---|---|---|
| | | | UNCOOKED | COOKED | |
| Mung Bean (comparative) | 0 ml | smooth, glossy, medium | transparent | strong, elastic | resilient, bland taste |
| Crosslinked Potato | 15 ml | smooth, glossy, heavy | transparent | strong, elastic | similar to M.B. |
| Crosslinked Potato | 12 ml | smooth, glossy, medium | transparent | strong, elastic | similar to M.B. |
| Crosslinked Potato | 10 ml | smooth, glossy, medium | transparent | strong, elastic | similar to M.B. |
| Crosslinked Potato | 7 ml | smooth, glossy, medium | transparent | strong, elastic | similar to M.B. |
| Crosslinked Potato | 5 ml | smooth, glossy, medium | transparent | strong, elastic | similar to M.B. |
| Crosslinked Potato | 3 ml | smooth, glossy, medium | transparent | strong, elastic | similar to M.B. |

*Crosslinked with phosphorus oxychloride.
M.B. indicates Mung Bean

EXAMPLE III

This example shows the use of various crosslinked sweet potato starches at 30% and 100% replacement. The noodles were prepared as described in Examples I and II.

The results in Table III show that the lightly crosslinked sweet potato (0.001% POCl$_3$) having a sediment volume of 5 ml was no better than the unmodified sweet potato starch even at only 30% replacement; the cooked noodles were soft, sticky, and not resilient. The cooked noodles prepared with crosslinked sweet potato starches having sediment volumes of 2-4 ml (0.01-0.0025% POCl$_3$) were similar in appearance and chewability to cooked mung bean noodles at 100% replacement. They were transparent with a slight yellow color which, if undesirable, can be removed by bleaching with sodium or calcium hypochlorite. It is expected they will be equally as good at 30% replacement as 100% replacement is more difficult. The more highly crosslinked sweet potato starch formed a dough which was difficult to extrude and, in addition, the cooked noodles dissolved in hot water.

EXAMPLE IV (comparative)

This example shows the evaluation of a derivatized crosslinked potato starch (crosslinked with sodium trimethaphosphate and derivatized with acetic anhydride to introduce acetate groups) at 30% and 100% replacement.

The results in Table IV show that only the crosslinked potato starch provided a satisfactory noodle whether or not the replacement level was 100% or only 30%.

TABLE III

Evaluation of Crosslinked Sweet Potato Noodles

| STARCH* | SEDIMENT VOLUME (ml) | % REPLACEMENT | UNCOOKED EXTRUDED** NOODLES APPEARANCE | COOKED EXTRUDED NOODLES APPEARANCE | CHEWABILITY |
|---|---|---|---|---|---|
| Mung Bean (comparative) | 0 ml | | smooth, glossy, medium | transparent | strong, elastic | resilient, bland taste |
| Unmodified Sweet Potato (control) | N.D. | 100% | opaque | soft, sticky | soft, not resilient |
| Crosslinked Sweet Potato (comparative) | 5 ml | 100% | opaque | soft, sticky | soft, not resilient |
| Crosslinked Sweet Potato | 4 ml | 100% | transparent | similar to M.B. | similar to M.B. |
| Crosslinked Sweet Potato | 3 ml | 100% | transparent | similar to M.B. | similar to M.B. |
| Crosslinked Sweet Potato | 2 ml | 100% | transparent | similar to M.B. | similar to M.B. |
| Crosslinked Sweet Potato | 1 ml | 100% | transparent | difficult to extrude | dissolved in hot water |
| Unmodified Sweet Potato (control) | N.D. | 30% | transparent | soft, sticky | soft, not resilient |
| Crosslinked Sweet Potato (comparative) | 5 ml | 30% | transparent | soft, sticky | soft, not resilient |

*Crosslinked with 0.001%, 0.0025%, 0.005%, 0.01%, and 0.015% of phosphorus oxychloride (POCl$_3$) with the higher amounts providing a lower sediment volume.
**Slightly Yellow
M.B. indicates Mung Bean.
N.D. indicates not determined.

TABLE IV

Evaluation of Derivatized and Crosslinked Potato Starches

| STARCH | * % STMP | % ACETIC ANHYDRIDE | % REPLACEMENT | EXTRUDED NOODLES | COOKED NOODLES APPEARANCE | CHEWABILITY |
|---|---|---|---|---|---|---|
| Crosslinked Potato | 0.08% | — | 100% | transparent | similar to M.B. | similar to M.B. |
| Crosslinked and Derivatized Potato (comparative) | 0.08% | 4.0% | 100% | N.D. | N.D. | N.D. |
| Crosslinked Potato | 0.1% | — | 100% | transparent | similar to M.B. | similar to M.B. |
| Crosslinked and Derivatized Potato (comparative) | 0.1% | 4.0% | 100% | N.D. | N.D. | N.D. |
| Crosslinked and Derivatized Potato (comparative) | 0.08% | 4.0% | 30% | transparent | soft, adhesive | soft, not resilient |
| Crosslinked and Derivatized Potato (comparative) | 0.1% | 4.0% | 30% | transparent | soft, adhesive | soft, not resilient |

*sodium trimetaphosphate crosslinking agent
N.D. - Unable to form noodle in hot water
M.B. indicates Mung Bean

EXAMPLE V

(comparative)

This Example shows the use of other starch bases, both modified and unmodified, for the preparation of the noodles. The results in Table V show that unmodified starches are unsuitable and that crosslinked starches other than potato or sweet potato did not provide a noodle comparable to the control.

TABLE V

| STARCH | EVALUATION OF COOKED NOODLES |
|---|---|
| 100% Mung Bean (Control) | Chewy, elastic bite |
| Unmodified Corn | Soft, less chewy, sticky |
| Unmodified Potato | Soft, less chewy, sticky |
| Unmodified Tapioca | Soft, less chewy, sticky |
| Unmodified Waxy Corn | Very soft, noodles disintegrate easily |
| Crosslinked Waxy Corn (0.4% STMP) | Very soft, noodles disintegrate easily |
| Crosslinked Corn (0.06% POCl$_3$) | Chewy and less sticky but not as chewy as control |
| Crosslinked Tapioca (0.07% STMP) | Chewy and less sticky but not as chewy as control |
| Crosslinked & Derivatized Waxy Corn 0.2% POCl$_3$ and 6.5% P.O. | Softer than X-linked |

POCl$_3$ - Phosphorus oxychloride
STMP - Sodium trimetaphosphate
PO - Propylene oxide

EXAMPLE VI

This example shows the relationship between the amount and type of crosslinking reagent used and the sediment volume. The results for crosslinked potato starches are shown in Table VI and those for crosslinked sweet potato starches in Table VII.

TABLE VI

SEDIMENT VOLUME OF 0.1% DISPERSION OF CROSSLINKED POTATO STARCH

| | % CROSSLINKING AGENT | SEDIMENT VOLUME (ml) |
|---|---|---|
| Unmodified Potato (comparative) | | No sediment |
| Crosslinked Potato | 0.015% POCl$_3$ | 3 |
| Crosslinked Potato | 0.01% POCL$_3$ | 5 |
| Crosslinked Potato | 0.005% POCl$_3$ | 12 |
| Crosslinked Potato | 0.0025% POCl$_3$ | 15 |
| Crosslinked Potato | 0.035% STMP | 10 |
| Crosslinked Potato | 0.06% STMP | 8 |
| Crosslinked Potato | 0.075% STMP | 7 |

POCl$_3$ - phosphorus oxychloride
STMP - sodium trimetaphosphate - estimated

TABLE VII

SEDIMENT VOLUME OF 0.1% DISPERSION OF CROSSLINKED SWEET POTATO STARCH

| | % CROSSLINKING AGENT | SEDIMENT VOLUME (ml) |
|---|---|---|
| Crosslinked Sweet Potato | 0.001% POCl$_3$ | 5 |
| Crosslinked Sweet Potato | 0.0025% POCl$_3$ | 4 |
| Crosslinked Sweet Potato | 0.005% POCl$_3$ | 3 |
| Crosslinked Sweet Potato | 0.01% POCl$_3$ | 2 |
| Crosslinked Sweet Potato | 0.015% POCl$_3$ | 1 |

POCl$_3$ - Phosphorus oxychoride

Now that the preferred embodiments of the invention have been described in detail, various modifications and improvements thereon will become readily apparent to

What is claimed is:

1. An extruded oriental noodle, consisting essentially of a starch and water, characterized in that the starch used in the preparation of the noodle is a mixture of mung bean starch and a granular crosslinked potato starch or a granular crosslinked sweet potato starch, the granular potato starch being crosslinked sufficiently to have a sediment volume of about 2–16 ml and the sweet potato starch being crosslinked to have a sediment volume of about 2–6 ml.

2. The noodle of claim 1, characterized in that it is comparable to an extruded oriental noodle consisting essentially of mung bean starch and water, with a similar appearance and texture both after extrusion and subsequent cooking, the uncooked extruded noodle being transparent and the cooked extruded noodle being strong and elastic with a resilient bite and bland taste.

3. The noodle of claim 1, wherein the crosslinked potato starch has a sediment volume of about 3–15 ml.

4. The noodle of claim 3, wherein the starch is crosslinked with phosphorus oxychloride or with sodium trimethaphosphate.

5. The noodle of claim 4, wherein the starch is crosslinked with the phosphorus oxychloride.

6. The noodle of claim 1, wherein the crosslinked starch is the crosslinked sweet potato starch.

7. The noodle of claim 6, wherein the starch is crosslinked with phosphorus oxychloride or with sodium trimethaphosphate.

8. The noodle of claim 7, wherein the starch is crosslinked with phosphorus oxychloride.

9. The noodle of claim 1, wherein the mixture contains about 30% but less than 100% of the granular crosslinked potato starch or the granular crosslinked potato sweet potato starch.

10. The noodle of claim 2, wherein about 30% of the mixture contains the granular crosslinked potato starch of the granular crosslinked sweet potato starch.

11. The noodle of claim 10, wherein the granular crosslinked starch is potato starch.

12. The noodle of claim 10, wherein the granular crosslinked starch is sweet potato starch.

* * * * *